United States Patent [19]

Schmitt et al.

[11] Patent Number: 5,401,846
[45] Date of Patent: Mar. 28, 1995

[54] PREPARATION OF 5-HALO-2-(1-ANTHRAQUINONYLAMINO)-BENZOIC ACIDS AND 4'-HALO-2,1(N)-ANTHRAQUINONYL-1',2'(N)-BENZACRIDONES

[75] Inventors: Michael Schmitt, Worms; Matthias Niedenbrueck, Limburgerhof; Manfred Patsch, Wachenheim, all of Germany

[73] Assignee: BASF Aktiengesellschaft, Ludwigshafen, Germany

[21] Appl. No.: 79,941

[22] Filed: Jun. 23, 1993

[30] Foreign Application Priority Data

Jul. 1, 1992 [DE] Germany .................. 42 21 606.0

[51] Int. Cl.⁶ ............................................. C09B 1/32
[52] U.S. Cl. ..................................... 546/58; 552/259
[58] Field of Search .................... 552/238, 259; 546/58

[56] References Cited

U.S. PATENT DOCUMENTS

| | | | |
|---|---|---|---|
| 961,047 | 6/1910 | Ullmann | 546/58 |
| 993,915 | 5/1911 | Ullmann | 552/259 |
| 1,008,906 | 11/1911 | Herzberg et al. | 546/58 |
| 1,950,348 | 3/1934 | Wuertz | 552/259 |
| 2,174,118 | 9/1939 | Callott | 552/238 |
| 2,226,909 | 12/1940 | Peter | 552/259 |
| 2,659,737 | 11/1953 | Peter | 552/259 |
| 2,736,731 | 2/1956 | Peter et al. | 552/259 |
| 3,316,280 | 4/1967 | Vollmann et al. | 552/238 |
| 3,797,995 | 3/1974 | Renfrew et al. | |
| 4,128,396 | 12/1978 | Wick et al. | 552/259 |
| 4,213,909 | 7/1980 | Berg | 552/238 |

FOREIGN PATENT DOCUMENTS

| | | | |
|---|---|---|---|
| 246966 | 5/1912 | Austria | 546/58 |
| 237236 | 6/1910 | Germany . | |
| 253090 | 12/1911 | Germany . | |
| 245875 | 4/1912 | Germany . | |
| 572215 | 3/1933 | Germany . | |
| 49-134738 | 12/1974 | Japan . | |
| 894 | of 1911 | United Kingdom . | |

OTHER PUBLICATIONS

Database WPI, Derwent Publications Ltd., AN 75-46730W [28], "Anthrachinondye Preparation" & JP-A-49 134 738, Dec. 25, 1974.

*Primary Examiner*—Donald G. Daus
*Attorney, Agent, or Firm*—Oblon, Spivak, McClelland, Maier & Neustadt

[57] ABSTRACT

There are described the preparation of 5-halo-2-(1-anthraquinonylamino)benzoic acids of the general formula I

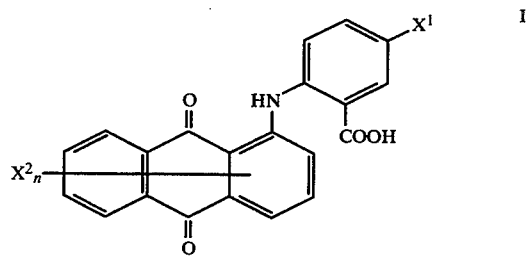

($X^1$: Cl or Br; $X^2$: H, Cl or Br, identical or different when $n > 1$; n: 1–6) by reacting 2-(1-anthraquinonylamino)benzoic acids II

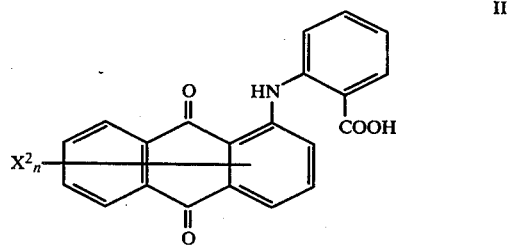

with the halogen in the presence of sulfuric acid, and the preparation of 4'-halo-2,1(N)-anthraquinonyl-1',2'(N)-benzacridones III

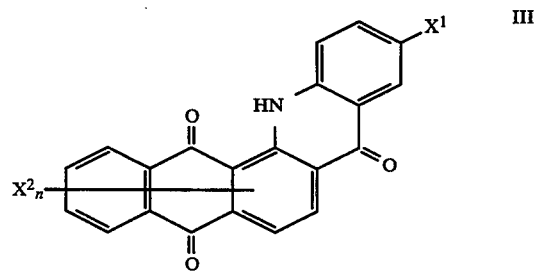

by cyclizing condensation of the acids I.

8 Claims, No Drawings

PREPARATION OF 5-HALO-2-(1-ANTHRAQUINONYLAMINO)-BENZOIC ACIDS AND 4'-HALO-2,1(N)-ANTHRAQUINONYL-1',2'(N)-BENZACRIDONES

The present invention relates to a novel process for preparing 5-halo-2-(1-anthraquinonylamino)benzoic acids of the general formula I

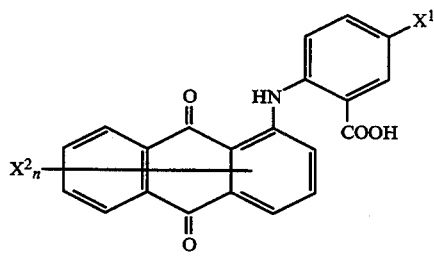

where
X¹ is chlorine or bromine,
X² is hydrogen, chlorine or bromine, the X² radicals for n>1 being identical or different, and is from 1 to 6,
and to the preparation of 4'-halo-2,1(N)-anthraquinonyl-1',2'(N)-benzacridones of the general formula III

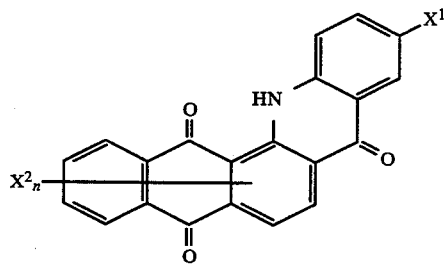

by cyclizing condensation of the acids I obtained according to the invention.

The 5-halo-2-(1-anthraquinonylamino)benzoic acids I and the 4'-halo-2,1(N)-anthraquinonyl-1',2'(N)-benzacridones III are important intermediates for the synthesis of vat dyes such as C.I. Vat Brown 46 (C.I. No. 70905). 4'-Bromo-2,1(N)-anthraquinonyl-1',2'(N)-benzacridone can also be used as a disperse dye for polyester.

The 4'-halogenated, in particular brominated, acridones III are conventionally prepared (e.g. DRP 253 090) by bromination in nitrobenzene of the corresponding unsubstituted anthraquinonylacridones, which in turn are available from 2-(1-anthraquinonylamino)benzoic acids by cyclizing condensation in an inert solvent such as nitrobenzene using an acid halide such as benzoyl chloride as condensing agent. However, this method of preparation has the considerable disadvantage that, in general, selective monobromination is not possible, since the anthraquinonylacridones used are only sparingly soluble and therefore have to be brominated at elevated temperature. Moreover, the nitrobenzene used as the reaction medium represents an additional waste water pollutant.

Furthermore, DRP 237 236 discloses preparing the acridones III by reaction of 1-chloroanthraquinone-2-carboxylic acid with, for example, p-bromoaniline and subsequent cyclizing condensation of the product 1-(4'-bromophenylamino)anthraquinone-2-carboxylic acids. However, the starting anthraquinonecarboxylic acid is costly to prepare in the requisite purity, since it is in general obtained together with polychlorinated products.

Finally, the preparation of brominated anthraquinonylbenzacridones by condensation of anthraquinonylaminobenzoic acids which have been brominated in the benzoic acid moiety is known from DRP 246 966, where, however, the reaction of 1-chloroanthraquinone with methyl 3,5-dibromoanthranilate gives only the 2',4'-dibrominated acridone. A selectively monobrominated product is difficult to obtain in this way, since the preparation of the corresponding monobrominated anthranilic acid is problematical.

It is an object of the present invention to make available 4'-halo-2,1(N)-anthraquinonyl-1',2'(N)-benzacridones III in good yields and high purities in a technically simple and economical manner.

We have found that this object is achieved by first finding a process for preparing 5-halo-2-(1-anthraquinonylamino)benzoic acids of the general formula I

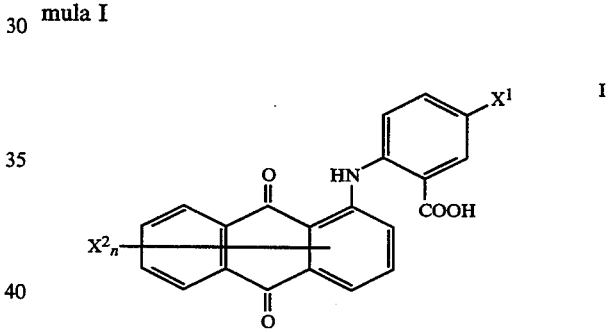

where
X¹ is chlorine or bromine,
X² is hydrogen, chlorine or bromine, the X² radicals for n>1 being identical or different, and
n is from 1 to 6,
which comprises reacting 2-(1-anthraquinonylamino)benzoic acids of the general formula II

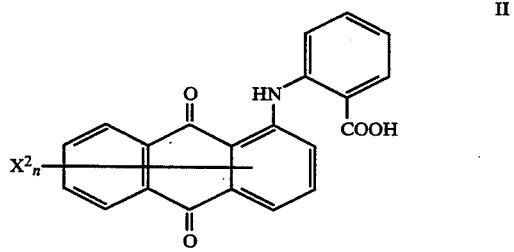

with the halogen in the presence of sulfuric acid.

We have further found a process for preparing 4'-halo-2,1(N)-anthraquinonyl-1',2'(N)-benzacridones of the general formula III

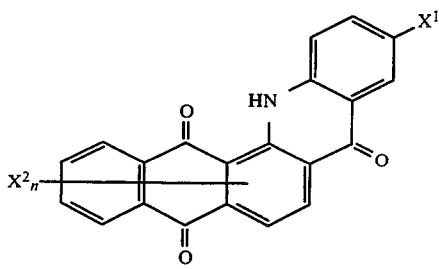

which comprises first reacting 2-(1-anthraquinonylamino)benzoic acids II with halogen in the presence of sulfuric acid to form 5-halo-2-(1-anthraquinonylamino)-benzoic acids I and then, after removal of any excess halogen and product hydrogen halide and after increasing the temperature, subjecting the acids I to a cyclizing condensation in the presence of sulfuric acid.

The preparation of the 5-halo-2-(1-anthraquinonylamino)benzoic acids I according to the invention by halogenating the corresponding unsubstituted acids II in sulfuric acid can be carried out under the conditions customary for such reactions.

For instance, the amount of bromine used in the preparation of the preferred, 5-brominated acids I will in general range from the stoichiometrically required value to a 50% excess, preferably to a 15% excess.

The reaction medium used will in general range from at least 85% by weight sulfuric acid to an oleum containing 10% by weight of $SO_3$. Preference is given to using from 96 to 100% by weight sulfuric acid.

The amount of sulfuric acid is not critical per se and will usually range from 10 to 15 times the amount of acid II to be brominated.

It is advantageous first to dissolve the acid II in the sulfuric acid and then to slowly add the bromine.

The reaction temperature is in general from 0° to 25° C., preferably from 0° to 5° C.

The reaction time is about 2–3 h.

The bromination can be carried out continuously as well as batchwise.

The process of the invention achieves the selective halogenation of the 2-(1-anthraquinonylamino)benzoic acids II and provides the desired 5-halo-2-(1-anthraquinonylamino)benzoic acids I in high yields and in sufficiently good purities that with advantage they can be cyclized directly without isolation to the corresponding acridones III.

If the acids I are to be isolated none the less, this can be done in a conventional manner by diluting the reaction mixture with water and filtering off the precipitated acids I.

Of course, the halogenation of the invention can also be carried out with other customary halogenating agents and in other inert solvents such as nitrobenzene and chlorobenzene.

However, the use of elemental halogen and sulfuric acid is always preferable, since a subsequent cyclizing condensation to the acridones III can be carried out directly in the reaction mixture obtained. In this case the sulfuric acid is used both as the condensing agent and as the reaction medium. Any excess halogen still present and the hydrogen halide formed in the course of the halogenation are simple to remove from the reaction mixture.

A suitable sulfuric acid for the novel cyclizing condensation of the 5-halo-2-(1-anthraquinonylamino)benzoic acids I to the 4'-halo-2,1(N)-anthraquinonyl-1',2'(N)-benzacridones III will in general range in concentration from 96% by weight to an oleum concentration of 10% by weight of $SO_3$. Here too it is preferable for the sulfuric acid to be from 96 to 100% by weight in strength.

The amount of sulfuric acid corresponds to the amounts used in the halogenation.

The reaction temperature is in general from 50° to 100° C., preferably from 70° to 80° C.

The reaction times depend on the concentration of the sulfuric acid and will in general range from 3 to 5 h in the case of 100% by weight sulfuric acid.

To carry out the cyclization according to the invention it is advantageous, after the halogenation, first to remove from the reaction mixture the halogen, which in general is present in excess, and the hydrogen halide formed, by blowing in a nonreactive gas such as nitrogen or air and then heating the reaction mixture to the reaction temperature.

The acridones III can then be isolated by cooling down to room temperature, pouring onto ice, filtering, washing and drying.

The cyclization too can be carried out continuously as well as batchwise.

Using the cyclizing condensation according to the invention it is possible to prepare the 4'-halo-2,1(N)-anthraquinonyl-1',2'(N)-benzacridones III in excellent yields (in general 96–99%) and good purities (in general >95%). Of particular advantage is the quasi single-stage nature of the process—halogenation and condensation are carried out in succession in the same reaction medium. No further condensing agent needs to be added, and the sulfuric acid used is advantageously recoverable in a regenerator. The process of the invention is thus additionally notable for its economy and technical simplicity.

The process of the invention is of particular importance for the preparation of 4'-bromo-4-chloro- and 4'-bromo-3-chloro-2,1(N)-anthraquinonyl-1',2'(N)-benzacridone and in particular of 4'-bromo-2,1(N)-anthraquinonyl-1',2'(N)-benzacridone.

EXAMPLES

A) Preparation of 5-bromo-2-(1-anthraquinonylamino)-benzoic acids I 22.5 g (0,14 mol) of bromine were added dropwise at from 0° to 5° C. to a solution of 0.1 mol of acid II in 500 g of 100% by weight sulfuric acid over 90 min. The mixture obtained was additionally stirred at from 0° to 5° C. for 3 h and then discharged onto 2 kg of an ice-water mixture.

The precipitated acid I was filtered off, washed with water and dried.

Details of these experiments and their results are listed in Table 1.

TABLE 1

Ia

| Ex. | Acid II | X$^{2'}$ | X$^{2''}$ | Yield | Content of I | Absolute yield | mp. [°C.] | IR (KBr) [cm$^{-1}$] |
|---|---|---|---|---|---|---|---|---|
| 1 | 2-(1-Anthraquinonyl-amino)benzoic acid | —H | —H | 40.2 g | >95 | 95% | 309–310 | 3400–2500 (broad); 1670, 1592, 1577, 1505, 1312, 1270, 1232 |
| 2 | 2-(1-Anthraquinonyl-amino-4-chloro)ben-zoic acid | —H | —Cl | 42.0 g | >95 | 92% | 230–235 | 3300–2400 (broad); 1675, 1575, 1500, 1250 |
| 3* | 2-(1-Anthraquinonyl-amino-3-chloro)ben-zoic acid | —Cl | —H | 44.0 g | 85 | 96% | 306–307 | 3300–2400 (broad); 1675, 1570, 1320, 1260, 1210 |

*the bromination was carried out in 500 g of 96% by weight sulfuric acid
In these examples, X$^1$ is Br.

B) Preparation of 4'-bromo-2,1(N)-anthraquinonyl-1',2'(N)-benzacridones III

Details of these experiments and the results are listed in Table 2.

TABLE 2

IIIa

| Ex. | Acid II | X$^{2'}$ | X$^{2''}$ | Yield | Content of II | Absolute yield | mp. [°C.] | IR (KBr) [cm$^{-1}$] |
|---|---|---|---|---|---|---|---|---|
| 4 | as for Ex. 1 | —H | —H | 200 g | >95 | 99% | 334–335 | 3300–3000; 1672, 1646, 1591, 1517, 1300, 1280 |
| 5 | as for Ex. 2 | —H | —Cl | 214 g | >95 | 98% | 283–287 | 3350–3250; 1675, 1650, 1610, 1590, 1500, 1300, 1260 |
| 6* | as for Ex. 3 | —Cl | —H | 210 g | 85 | 96% | 270–274 | 3200–3000; 1675, 1650, 1610, 1575, 1520, 1325, 1310 |

*the bromination was carried out in 2.5 kg of 96% by weight sulfuric acid
In these examples, X$^1$ is Br.

EXAMPLES 4 TO 6

91.9 g (0.57 mol) of bromine were added dropwise at from 0° to 5° C. to a solution of 0.5 mol of acid II in 2.5 kg of 100% by weight sulfuric acid over 90 min. The mixture obtained was additionally stirred at from 0° to 5° C. for 3 h.

Then excess bromine and hydrogen bromide were expelled using compressed air. The reaction mixture was subsequently stirred at 75° C. for 5 h and, after cooling down to room temperature, discharged onto 3 kg of ice-water.

The precipitated acridone III was filtered off, washed neutral with water and dried.

We claim:
1. A process for preparing 5-bromo-2-(1-anthraquinonylamino)benzoic acids of the formula I

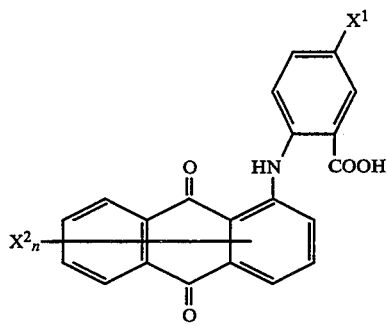

where
X¹ is bromine,
X² is hydrogen, chlorine or bromine, the X² radicals for n>1 being identical or different, and n is from 1 to 6,
which comprises adding 1–1.5 molar equivalents of bromine to a reaction medium consisting essentially of 2-(1-anthraquinonylamino)benzoic acid of formula II

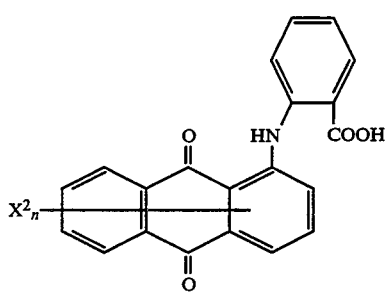

and 96 to 100 wt. % sulfuric acid at a temperature of 0°–25° C.

2. A process for preparing 4'-bromo-2,1(N)-anthraquinonyl-1',2'(N)-benzacridones of the formula III

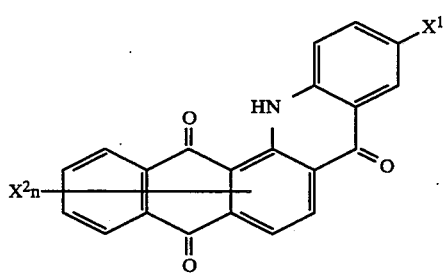

where
X¹ is bromine,
X² is hydrogen, chlorine or bromine, the X² radicals for n>1 being identical or different, and n is from 1 to 6, which comprises first adding 1–1.5 molar equivalents of bromine to a reaction medium consisting essentially of 2-(1-anthraquinonylamino)-benzoic acid of formula II

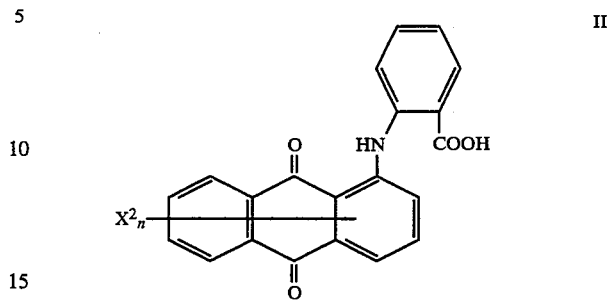

and 96 to 100% sulfuric acid at a temperature of 0°–25° C. to form a 5-bromo-2-(1-anthraquinonylamino)benzoic acid of the formula I

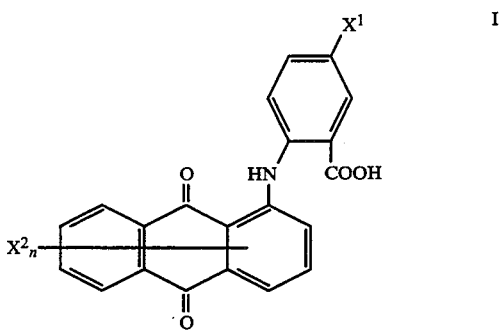

in at least 92% absolute yield and then removing excess bromine and product hydrogen bromide and then raising the temperature to 50°–100° C.

3. A process as claimed in claim 2, wherein 4'-bromo-2,1(N)-anthraquinonyl-1',2'(N)-benzacridone is prepared.

4. The process of claim 1 wherein bromine is used in stoichiometric excess up to a 50 mole % stoichiometric excess based on the substrate to be brominated.

5. The process of claim 1 wherein bromine is used in stoichiometric excess up to a 15 mole % stoichiometric excess based on the substrate to be brominated.

6. The process of claim 2 wherein bromine is used in stoichiometric excess up to a 15 mole % stoichiometric excess based on the substrate to be brominated.

7. The process of claim 2 wherein the compound of formula III is obtained after the temperature is raised to 70° C. to 80° C.

8. The process of claim 2 wherein bromine is used in up to a 15% stoichiometric excess based on the substrate to be brominated, wherein said bromination occurs at a temperature of from 0° C. to about 25° C., and wherein hydrogen bromide and bromine are removed by blowing in a non-reactive gas prior to raising the reaction temperature.

* * * * *